(12) United States Patent
Baughman et al.

(10) Patent No.: US 11,270,686 B2
(45) Date of Patent: Mar. 8, 2022

(54) DEEP LANGUAGE AND ACOUSTIC MODELING CONVERGENCE AND CROSS TRAINING

(71) Applicant: International Business Machines Corporation, Armonk, NY (US)

(72) Inventors: Aaron K. Baughman, Silver Spring, MD (US); John M. Ganci, Jr., Cary, NC (US); Stephen C. Hammer, Marietta, GA (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/471,436

(22) Filed: Mar. 28, 2017

(65) Prior Publication Data

US 2018/0286386 A1 Oct. 4, 2018

(51) Int. Cl.
*G10L 15/06* (2013.01)
*G10L 15/01* (2013.01)
(Continued)

(52) U.S. Cl.
CPC ............ *G10L 15/063* (2013.01); *G10L 15/01* (2013.01); *G10L 15/16* (2013.01); *G10L 15/183* (2013.01);
(Continued)

(58) Field of Classification Search
CPC ....... G10L 15/063; G10L 15/01; G10L 15/16; G10L 15/1807; G10L 15/183; G10L 15/30; G10L 25/51
See application file for complete search history.

(56) References Cited

U.S. PATENT DOCUMENTS

| 6,366,882 B1 * | 4/2002 | Bijl .......................... G06F 3/16 |
| | | 704/231 |
| 6,912,499 B1 * | 6/2005 | Sabourin ............... G10L 15/063 |
| | | 704/243 |

(Continued)

OTHER PUBLICATIONS

Tian Tan et al., "Cluster Adaptive Training for Deep Neural Network Based Acoustic Model", IEEE/ACM Transactions on Audio, Speech, and Language Processing, vol. 24, No. 3, Mar. 2016, pp. 459-468.

(Continued)

*Primary Examiner* — Fariba Sirjani
(74) *Attorney, Agent, or Firm* — Stephen J. Walder, Jr; Anthony V. England

(57) ABSTRACT

A model-pair is selected to recognize spoken words in a speech signal generated from a speech, which includes an acoustic model and a language model. A degree of disjointedness between the acoustic model and the language model is computed relative to the speech by comparing a first recognition output produced from the acoustic model and a second recognition output produced from the language model. When the acoustic model incorrectly recognizes a portion of the speech signal as a first word and the language model correctly recognizes the portion of the speech signal as a second word, a textual representation of the second word is determined and associated with a set of sound descriptors to generate a training speech pattern. Using the training speech pattern, the acoustic model is trained to recognize the portion of the speech signal as the second word.

25 Claims, 10 Drawing Sheets

(51) Int. Cl.
*G10L 25/51* (2013.01)
*G10L 15/183* (2013.01)
*G10L 15/18* (2013.01)
*G10L 15/30* (2013.01)
*G10L 15/16* (2006.01)

(52) U.S. Cl.
CPC .......... *G10L 15/1807* (2013.01); *G10L 15/30* (2013.01); *G10L 25/51* (2013.01)

(56) References Cited

U.S. PATENT DOCUMENTS

| | | | |
|---|---|---|---|
| 6,934,682 B2 | 8/2005 | Woodward | |
| 7,813,926 B2 | 10/2010 | Wang et al. | |
| 8,112,274 B2* | 2/2012 | Beyerlein | G06F 17/17 |
| | | | 704/234 |
| 8,285,546 B2* | 10/2012 | Reich | G10L 15/187 |
| | | | 379/88.08 |
| 8,412,521 B2 | 4/2013 | Mathias et al. | |
| 9,324,323 B1 | 4/2016 | Bikel et al. | |
| 2002/0002460 A1 | 1/2002 | Pertrushin | |
| 2002/0010587 A1 | 1/2002 | Pertrushin | |
| 2002/0111806 A1* | 8/2002 | Franz | G10L 15/18 |
| | | | 704/255 |
| 2004/0264677 A1* | 12/2004 | Horvitz | H04M 3/527 |
| | | | 379/265.02 |
| 2005/0182628 A1* | 8/2005 | Choi | G10L 15/08 |
| | | | 704/252 |
| 2007/0168157 A1* | 7/2007 | Khibnik | G05B 13/04 |
| | | | 702/182 |
| 2007/0219798 A1* | 9/2007 | Wang | G10L 15/063 |
| | | | 704/257 |
| 2008/0319743 A1* | 12/2008 | Faisman | G10L 15/065 |
| | | | 704/235 |
| 2010/0179811 A1* | 7/2010 | Gupta | G10L 15/22 |
| | | | 704/235 |
| 2010/0268536 A1* | 10/2010 | Suendermann | G10L 15/063 |
| | | | 704/243 |
| 2012/0166183 A1* | 6/2012 | Suendermann | G06F 17/289 |
| | | | 704/9 |
| 2015/0019214 A1* | 1/2015 | Wang | G10L 15/34 |
| | | | 704/232 |
| 2015/0287405 A1* | 10/2015 | Biadsy | G10L 15/063 |
| | | | 704/257 |
| 2016/0086599 A1* | 3/2016 | Kurata | G10L 15/063 |
| | | | 704/243 |
| 2016/0162456 A1 | 6/2016 | Munro et al. | |
| 2016/0260428 A1* | 9/2016 | Matsuda | G06N 3/08 |
| 2016/0321506 A1* | 11/2016 | Fridental | G06K 9/00771 |
| 2017/0053644 A1* | 2/2017 | Rennie | G06N 3/08 |
| 2017/0053652 A1* | 2/2017 | Choi | G10L 15/32 |
| 2017/0169813 A1* | 6/2017 | Suzuki | G10L 15/063 |
| 2018/0060282 A1* | 3/2018 | Kaljurand | G06F 17/211 |
| 2021/0005184 A1* | 1/2021 | Rao | G10L 15/187 |

OTHER PUBLICATIONS

Peter Bell et al., "Multitask Learning of Context-Dependent Targets in Deep Neural Network Acoustic Models", IEEE/ACM Transactions on Audio, Speech, and Language Processing, vol. 25, No. 2, Feb. 2017, pp. 238-247.

Yajie Miao et al., "Speaker Adaptive Training of Deep Neural Network Acoustic Models Using I-Vectors", IEEE/ACM Transactions on Audio, Speech, and Language Processing, vol. 23, No. 11, Nov. 2015, pp. 1938-1949.

Akira Takagi et al., "Unsupervised Cross-Adaptation Using Language Model and Deep Learning Based Acoustic Model Adaptation", No. 978-616-823-8, APSIPA2014, pp. 1-4.

A. Stolcke et al., "The SRI Mar. 2000 HUB-5 Conversational Speech Transcription System", Speech Technology and Research Laboratory, SRI International, Menlo Park, California, Mar. 2000, pp. 1-6.

* cited by examiner

DEEP LANGUAGE AND ACOUSTIC MODELING CONVERGENCE AND CROSS TRAINING

TECHNICAL FIELD

The present invention relates generally to a method, system, and computer program product for improving automatic voice recognition systems. More particularly, the present invention relates to a method, system, and computer program product for deep language and acoustic modeling convergence and cross-training.

BACKGROUND

Automatic speech recognition (ASR) systems are used for machine understanding of human speech. The idea is for the machine to understand words and sentences spoken by a human user in a natural language, and then cause some machine operation to occur as a result of that understanding.

A natural language is a written or a spoken language having a form that is employed by humans for primarily communicating with other humans or with systems having a natural language interface.

Natural language processing (NLP) is a technique that facilitates exchange of information between humans and data processing systems. For example, one branch of NLP pertains to transforming human readable or human understandable content into machine usable data. For example, NLP engines are presently usable to accept input content such as a newspaper article or human speech, and produce structured data, such as an outline of the input content, most significant and least significant parts, a subject, a reference, dependencies within the content, and the like, from the given content.

Another branch of NLP pertains to answering questions about a subject matter based on information available about the subject matter domain. This is the branch of cognitive analytics, and is also referred to as a Question and Answer system (Q and A system). Cognitive analytics is the process of analyzing available information or knowledge to create, infer, deduce, or derive new information.

The illustrative embodiments recognize that regardless of how human speech is recognized and understood, most ASR systems use a language model and an acoustic model to identify the words being spoken. A language model provides probabilistic indications that a series of words are found together for a particular subject-matter domain. In other words, a language model provides the probability that n words—arranged as they are in a given circumstance—are likely or unlikely to appear in the information in a given language and pertaining to a given subject-matter domain.

For example, two words—"thoracic" and "surgery" are likely to appears in the arrangement "thoracic surgery" in the subject-matter domain of medical sciences, but are unlikely to appear in that arrangement the subject-matter domain of kindergarten learning. Thus, a user may have actually spoken "thoracic surgery" in a medical context, and the ASR system may have recognized the words correctly; but if the context was kindergarten learning, the user may have spoken something else which the ASR system recognized incorrectly as thoracic surgery.

In this manner, using a language model, the semantic meaning of a several words together can be determined from a subject-matter domain. The following expression shows an n-gram language model that determines the probability that n words, w, are in a correct sequential order for a given domain (for two word sequences, the language model is called a bi-gram)—

$$P(w_n | w_{n-1}) = \frac{P(w_{n-1}, w_n)}{P(w_{n-1})}$$

An acoustic model determines a probability that a given audio signal includes a series of words of human speech, the probability of phones (a phonetically distinct sound in a speech) given a signal, and recognizes the spoken words from the signal using these probabilities. The following expressions represent a general purpose acoustic model—

$$P(\text{words} | \text{signal}) = \frac{P(\text{words})P(\text{signal} | \text{words})}{P(\text{signal})}$$

$$P(\text{signal}|\text{words}) \cdot P(\text{phones}|\text{word}) P(\text{signal}|\text{phone})$$

The probability of phones given a word is traditionally calculated by a Markov Model (MM) where the probability of a signal given a phone from a Hidden Markov Model (HMM). Acoustic models can be a combination of HMMs and deep learning algorithms.

Most ASR systems use a language model and an acoustic model to recognize the speech. The illustrative embodiments recognize that presently, in ASR systems, the language model and the acoustic model become disjoined (or, disjointed) from each other. A model is disjointed from another model when given the same speech input the two models recognize different words in the speech. The illustrative embodiments further recognize that as the language models and acoustic models are trained over a domain, the models become progressively more disjointed over time with more training.

The illustrative embodiments recognize that the disjointedness between a language model and an acoustic model can be measured in terms of the number of differences in the words recognized by two models. For example, if the language model and the acoustic model recognize all the words identically, the two models are not disjointed, or disjointed by zero degrees or units on a scale of disjointedness. The scale can be chosen in any suitable manner, e.g., a scale of 1-5, 1-100, 0-9, none-low-medium-high-extreme, and so on.

Conversely, if the language model and the acoustic model recognize none the words identically, the two models are completely disjointed, or disjointed by the maximum degree or units on the scale of disjointedness. If the language model and the acoustic model fail to recognize some of the words identically, the two models are disjointed by some degree or units on the scale of disjointedness.

The illustrative embodiments recognize that the disjointedness of a language model and an acoustic model for a given domain is undesirable. Perfect synchronization (no disjointedness) between a language model and an acoustic model, over time and for a domain, would be ideal. Preferably, if a language model and an acoustic model are disjointed to an acceptable degree, the disjointedness should not expand or increase over time, with new inputs and training in the domain. Preferably, the disjointedness should shrink from a present level or at least stay steady at an acceptable level.

SUMMARY

The illustrative embodiments provide a method, system, and computer program product. An embodiment includes a method that selects, to recognize spoken words in a speech signal generated from a speech, a model-pair, the model-pair comprising an acoustic model and a language model. The embodiment computes a degree of disjointedness between the acoustic model and the language model relative to the speech by comparing, responsive to the model pair performing speech recognition on the speech signal, a first recognition output produced from the acoustic model and a second recognition output produced from the language model. The embodiment determines, responsive to the acoustic model incorrectly recognizing a portion of the speech signal as a first word and the language model correctly recognizing the portion of the speech signal as a second word, a textual representation of the second word. The embodiment associates with the textual representation, a set of sound descriptors. The embodiment generates, using the textual representation and the set of sound descriptors, a training speech pattern. The embodiment trains, using the training speech pattern to produce a retrained acoustic model, the acoustic model to recognize the portion of the speech signal as the second word, the training causing the retrained acoustic model and the language model to recognize the portion of the speech signal as the second word. Thus, the embodiment causes an error in the acoustic model be corrected through retraining using the language model's success.

An embodiment further determines, responsive to the language model incorrectly recognizing a second portion of the speech signal as a third word and the acoustic model correctly recognizing the second portion of the speech signal as a fourth word, a second textual representation of the fourth word. The embodiment trains, using the second textual representation to produce a retrained language model, the language model to recognize the second portion of the speech signal as the fourth word, the training causing the retrained language model and the acoustic model to recognize the second portion of the speech signal as the fourth word. Thus, the embodiment causes an error in the language model be corrected through retraining using the acoustic model's success.

An embodiment further causes a second degree of disjointedness between (i) either of the acoustic model and the retrained acoustic model and (ii) the retrained language model, to be lower than the degree of disjointedness. Thus, the embodiment maintains or improves the degree of disjointedness between the acoustic model and the language model for the domain.

An embodiment further determines a severity of an error associated with the language model incorrectly recognizing the second portion of the speech signal as the third word. The embodiment boosts a number of occurrences of the second textual representation in a language training data used in the training of the language model, wherein the number of occurrences is a function of the severity. Thus, the embodiment modifies the training data of a language model such that the model can be trained differently for different degrees of errors.

The embodiment further determines a severity of an error associated with the acoustic model incorrectly recognizing the portion of the speech signal as the first word. The embodiment boosts a number of occurrences of the training speech pattern in an acoustic training data used in the training, wherein the number of occurrences is a function of the severity. Thus, the embodiment modifies the training data of an acoustic model such that the model can be trained differently for different degrees of errors.

In another embodiment, the set of sound descriptors corresponds to a set of characteristics of a sound produced by a speaker of the speech. Thus, the embodiment configures training data according to the characteristics of the sound of a particular speech used in the domain.

Another embodiment further operates, as a part of the determining the textual representation, the language model on the portion of the speech signal, wherein the language model produces the textual representation. Thus, the embodiment obtains the textual data for the training from the language model that correctly recognized the word.

In another embodiment, the degree of disjointedness is a function of a number of words in the speech that one model in the model-pair recognizes correctly and the second model in the model-pair recognizes incorrectly. Thus, the embodiment provides a method of computing the degree of disjointedness.

Another embodiment further configures a neural Turing machine to correlate a set of inputs to pairs of acoustic models and language models in a models library, the set of inputs comprising a vector and a disjoin tolerance, wherein the vector comprises a numeric representation of a word, and wherein the disjoin tolerance is a limit applicable to the degree of disjointedness. The embodiment outputs from the neural Turing machine the model-pair responsive to the model-pair relating to the set of inputs. Thus, the embodiment provides a method for initially selecting the model-pair.

In another embodiment, the set of inputs further comprise (i) a performance specification, (ii) a sound descriptor. Thus, the embodiment provides another method for initially selecting the model-pair.

In another embodiment, the performance specification specifies a minimum acceptable word recognition rate for a subject-matter domain of the speech. Thus, the embodiment provides another method for initially selecting the model-pair.

In another embodiment, the performance specification specifies a maximum acceptable word error rate for a subject-matter domain of the speech. Thus, the embodiment provides another method for initially selecting the model-pair.

In another embodiment, the sound descriptor comprises a prosody of the speech. Thus, the embodiment provides another method for initially selecting the model-pair.

In another embodiment, the sound descriptor comprises an accent used by a speaker of the speech. Thus, the embodiment provides another method for initially selecting the model-pair.

In another embodiment, the sound descriptor comprises a dialect of a language used by a speaker of the speech. Thus, the embodiment provides another method for initially selecting the model-pair.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
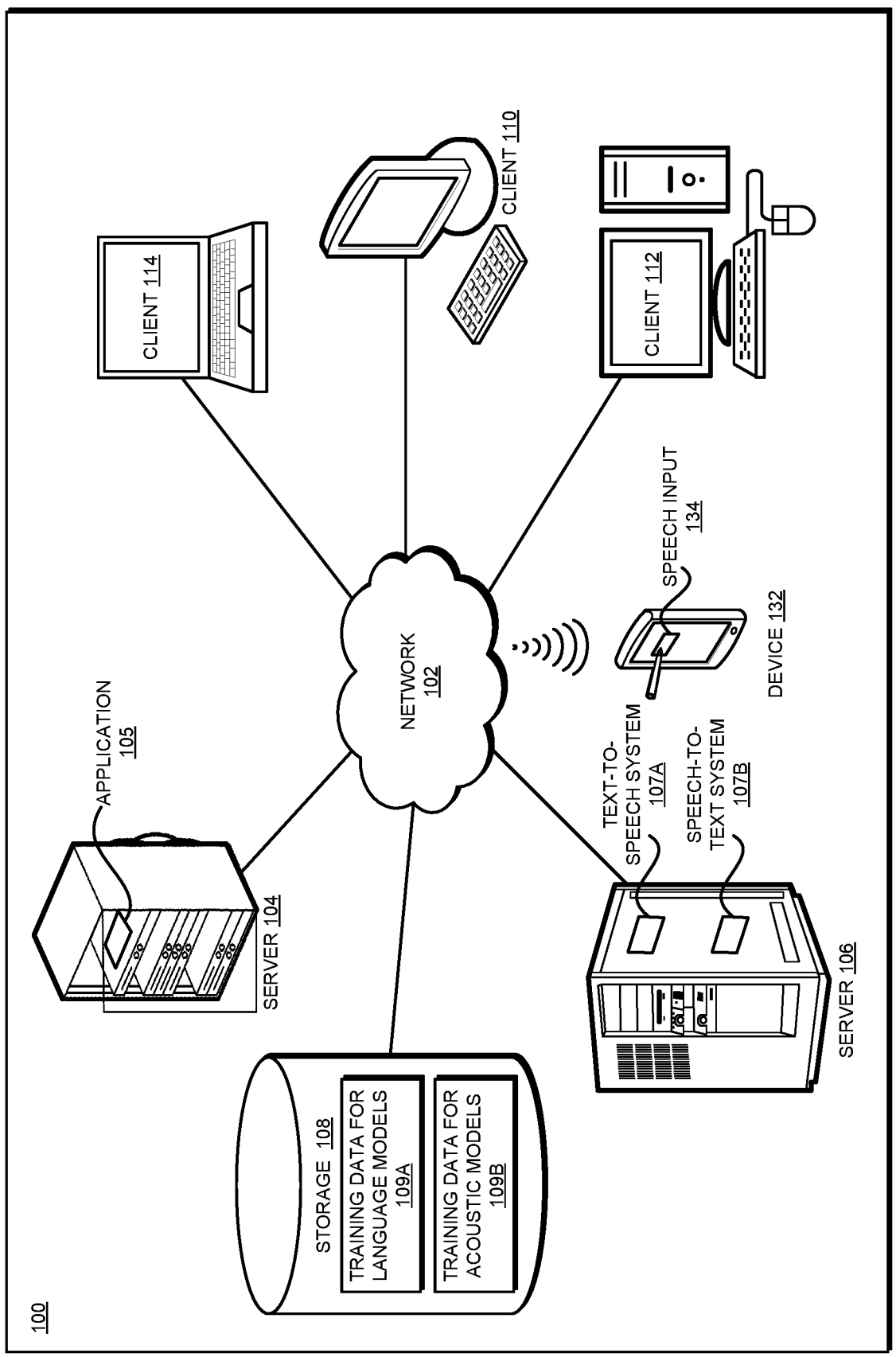
FIG. 1 depicts a block diagram of a network of data processing systems in which illustrative embodiments may be implemented.

The illustrative embodiments recognize that the presently available tools or solutions do not address these problems or provide adequate solutions for these problems. The illustrative embodiments used to describe the invention generally address and solve the above-described problems and other related problems by deep language and acoustic modeling convergence and cross-training.

An embodiment can be implemented as a software application. The application implementing an embodiment, or one or more components thereof, can be configured as a modification of an existing ASR system—i.e., a native application in the ASR system, as an application executing in a data processing system communicating with an existing ASR system over a local area network (LAN)—i.e., a local application on the LAN, as an application executing in a data processing system communicating with an existing ASR system over a wide area network (WAN)—i.e., a remote application on the WAN, as a separate application that operates in conjunction with an existing ASR system in other ways, a standalone application, or some combination thereof.

An embodiment improves a selection method by which a language model and an acoustic model (a model pair) is selected. Language models as well as acoustic models have certain performance parameters associated with them. Word error rate (WER) and word recognition rate (WRR) are two such parameters. The embodiment further classifies, in a library of models, a model with additional parameters that are descriptive of sound and optionally text resulting from that sound.

As some examples, sound descriptors for which a model (language or acoustic) may be acceptably suitable include but are not limited to—a particular language, a particular dialect of the language, an accent used by certain speakers (of the language or dialect), the sounds used in the vocabulary of a specific domain, and so on. The embodiment identifies particular model's strengths and weaknesses as to these and other sound descriptors. The embodiment then records parameter values corresponding to the various sound descriptors relative to a model in the model library.

A neural Turing machine is a neural network that is able to infer relationships between inputs and outputs in an algorithmic manner neural Turing machines have memory in that a neural Turing machine can remember an input-output correlation from the past and can reapply that correlation in new computations. A neural Turing machine can also interact with external memory, in the manner of an algorithmic computation.

An embodiment configures a neural Turing machine to access a model library, and select models from the library. The embodiment provides the configured neural Turing machine a set of inputs. The set of inputs includes performance requirements, sound descriptors, word vectors, and disjointedness limits.

The performance requirements input includes a maximum WER acceptable for a particular use, and a minimum WRR acceptable for the use. The sound descriptors include any number of types of sound descriptors including but not limited to those described herein, such as a dialect, an accent, and so on.

A word vector is a vector of numbers that represents a word or words. Any number of word vectors can be supplied as input to the neural Turing machine. The particular use may have an acceptable tolerance for disjointedness, i.e., a disjoin tolerance. The disjoin tolerance value is also supplied to the neural Turing machine as an input.

The neural Turing machine computes a relationship between the specified inputs and the parameters associated with the various models in the library. The neural Turing machine computes how various model pairs (a language model and an acoustic model) satisfy or do not satisfy the specified inputs. The neural Turing machine outputs a model pair, to wit, identifiers or locators of a language model and an acoustic model. The identified models when used as a model pair satisfy the specified input requirements.

An embodiment uses the output of the neural Turing machine the model pair with an actual speech input. The embodiment compares the speech recognition outputs of the acoustic model and the language model to compute a disjointedness value (D). The computed disjointedness value represents how disjointed the selected language model and acoustic model are when subjected to the actual speech input. The embodiment also identifies the words that the acoustic model missed to recognize from the speech input, and the words the language model missed to recognize from the speech input.

For a signal pattern that the acoustic model failed to recognize correctly but the language model recognized correctly (A miss), an embodiment selects the textual output of the language model corresponding to the pattern. The application mixes with the text one or more sound descriptors, such as a dialect, a prosody, an accent, etc. as needed such that the mixture is representative of the actual speech that was input. The embodiment generates a sound signal—an audio signal—using the mixture. The embodiment uses the generated signal as a training input for cross-training the acoustic model in recognizing the corresponding pattern in the actual speech input. Cross-training is the process of training one model, to remove or reduce an error in the model for an input, using a correct output for the same input from another model, where the two models are used together on the input.

In a similar manner, for a signal pattern that the language model failed to recognize correctly but the acoustic model recognized correctly (L miss), an embodiment selects the speech recognition output of the acoustic model corresponding to the pattern. The application converts the output to generate text of the word or words that were spoken in the actual speech that was input. The embodiment uses the generated text as a training input for cross-training the language model in recognizing the corresponding pattern in the actual speech input.

It is possible that a pattern might appear one or more times in the actual speech input. It is also possible that the acoustic model (or language model) may miss the correct recognition of the pattern some number of the times and/or correctly recognize the pattern some other number of times. Depending on the ratio of correct recognition of the pattern and the incorrect recognition of the pattern, an embodiment establishes a severity of the error in the model for that pattern.

The embodiment boosts training input corresponding to the pattern in the training data of a model depending upon the severity of the error in the model relative to the pattern. Boosting is the process of introducing the training input numerous times in the training data. The number of times the training input is used in the training data is a function of the severity of the error in recognizing the corresponding pattern in the actual speech input. In one embodiment, the function is a proportionality function.

An embodiment reselects the model pair after one or both models in the model pair have been cross-trained or retrained using boosted or un-boosted training inputs. The embodiment provides the cross-trained model pair the actual speech input again. The embodiment computes a revised disjointedness value (D') for the model pair. The embodiment records the revised disjointedness value corresponding to the models in the model pair in the model library.

An embodiment also determines the revised set of A misses (A' miss) and L misses (L' miss). The embodiment uses the A' misses and L' misses in a manner described herein to iteratively cross-train the acoustic model and the language model and increase the WRR, decrease the WER, or both speech recognition in the domain.

The manner of deep language and acoustic modeling convergence and cross-training described herein is unavailable in the presently available methods. A method of an embodiment described herein, when implemented to execute on a device or data processing system, comprises substantial advancement of the functionality of that device or data processing system in reducing the disjointedness of the acoustic models and the language models used in ASR systems for domain-specific human speech recognition.

The illustrative embodiments are described with respect to certain types of models, speech or sound descriptors, parameters, values, degrees, scales, subject-matter domains, algorithms, equations, neural network configurations, locations of embodiments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
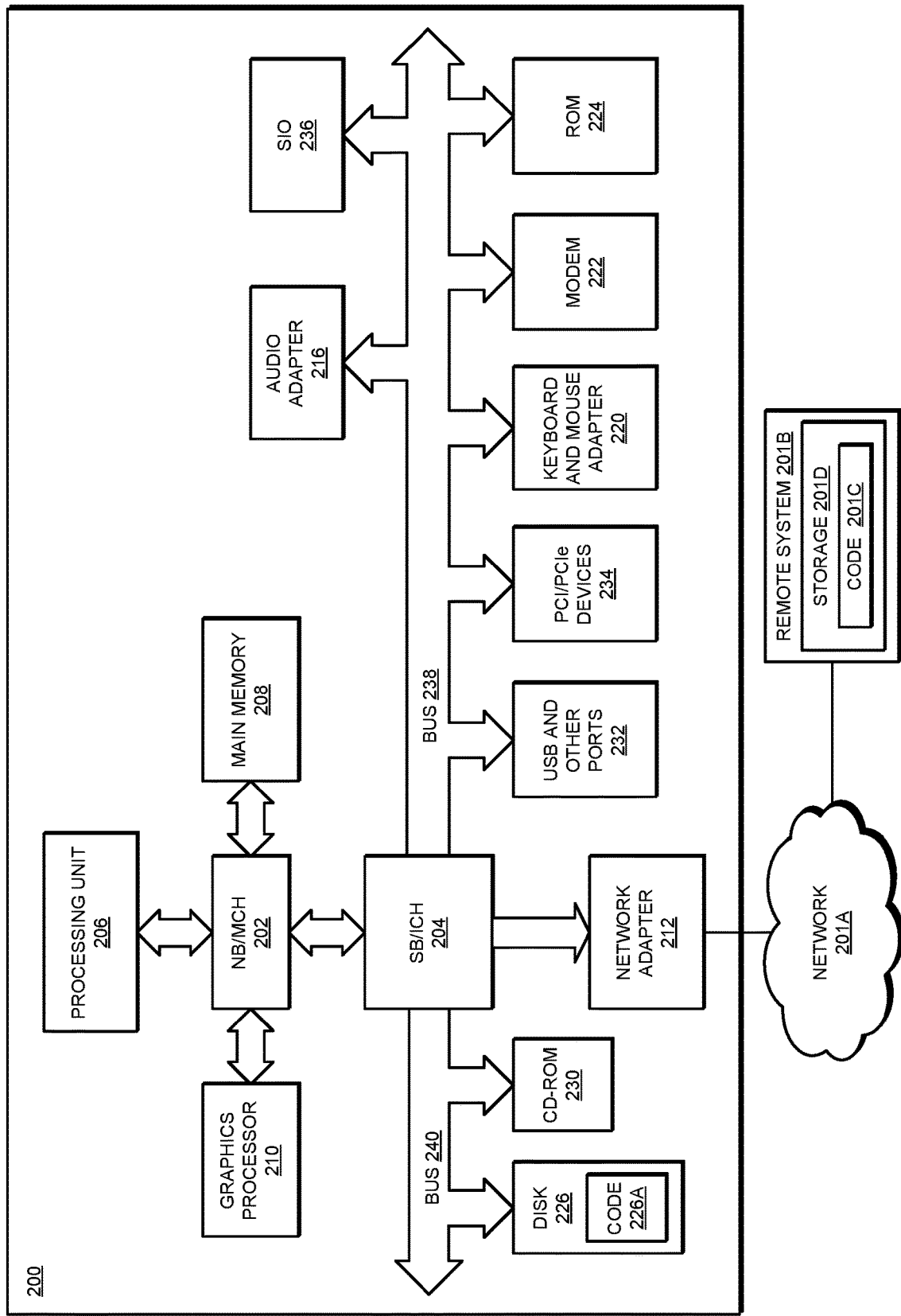
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Text-to-speech (T2S) system 107A is used for converting a given text of a word or words into a speech signal according to a given language and subject-matter domain. Speech-to-text (S2T) system 107B is used for converting a speech signal to a corresponding text in a given language and subject-matter domain. Training data 109A is usable to train a language model. Training data 109B is usable to train an acoustic model. Speech input 134 is provided by a user using a suitable device, such as a microphone in device 132. Device 132 transmits speech input 134 or otherwise makes speech input 134 available to application 105.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
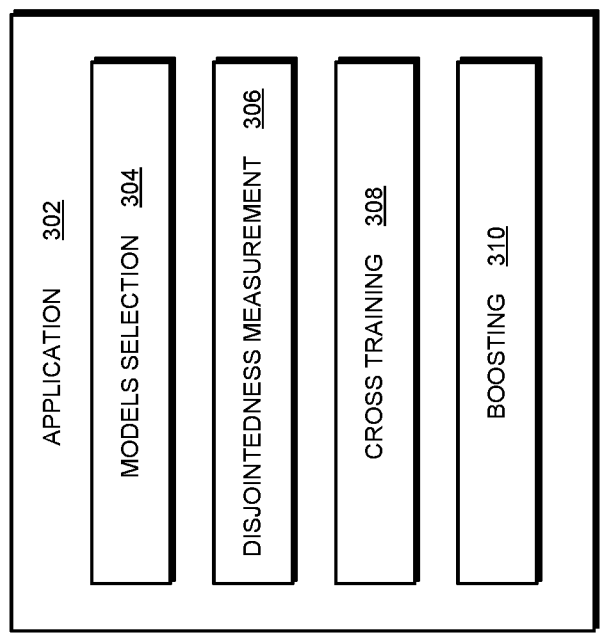
FIG. 3 depicts a block diagram of an example configuration for deep language and acoustic modeling convergence and cross-training in accordance with an illustrative embodiment.

With reference to FIG. 3, this figure depicts a block diagram of an example configuration for deep language and acoustic modeling convergence and cross-training in accordance with an illustrative embodiment. Application 302 is an example of application 105 in FIG. 1.

Component 304 performs a models selection function. The models selection function includes configuring a neural Turing machine, providing the inputs to the configured neural Turing machine, and obtaining the selected model-pair, i.e., an acoustic model and a language model, from the configured neural Turing machine, as described herein.

Component 306 performs a disjointedness measurement function. The disjointedness measurement function determines a degree or value of disjoin between the selected acoustic model and language model given an actual speech input, as described herein.

Component 308 performs a cross-training function. The cross-training function uses a speech signal portion that is successfully recognized by the acoustic model to train the language model where the language model has not been successful in recognizing the same speech signal portion, and vice-versa, as described herein.

Component 310 performs a boosting function. The boosting function causes replication or reappearance in training data of a model, of one or more variations of a missed word, depending upon the severity of the error related to the miss, as described herein.

Figure 4:
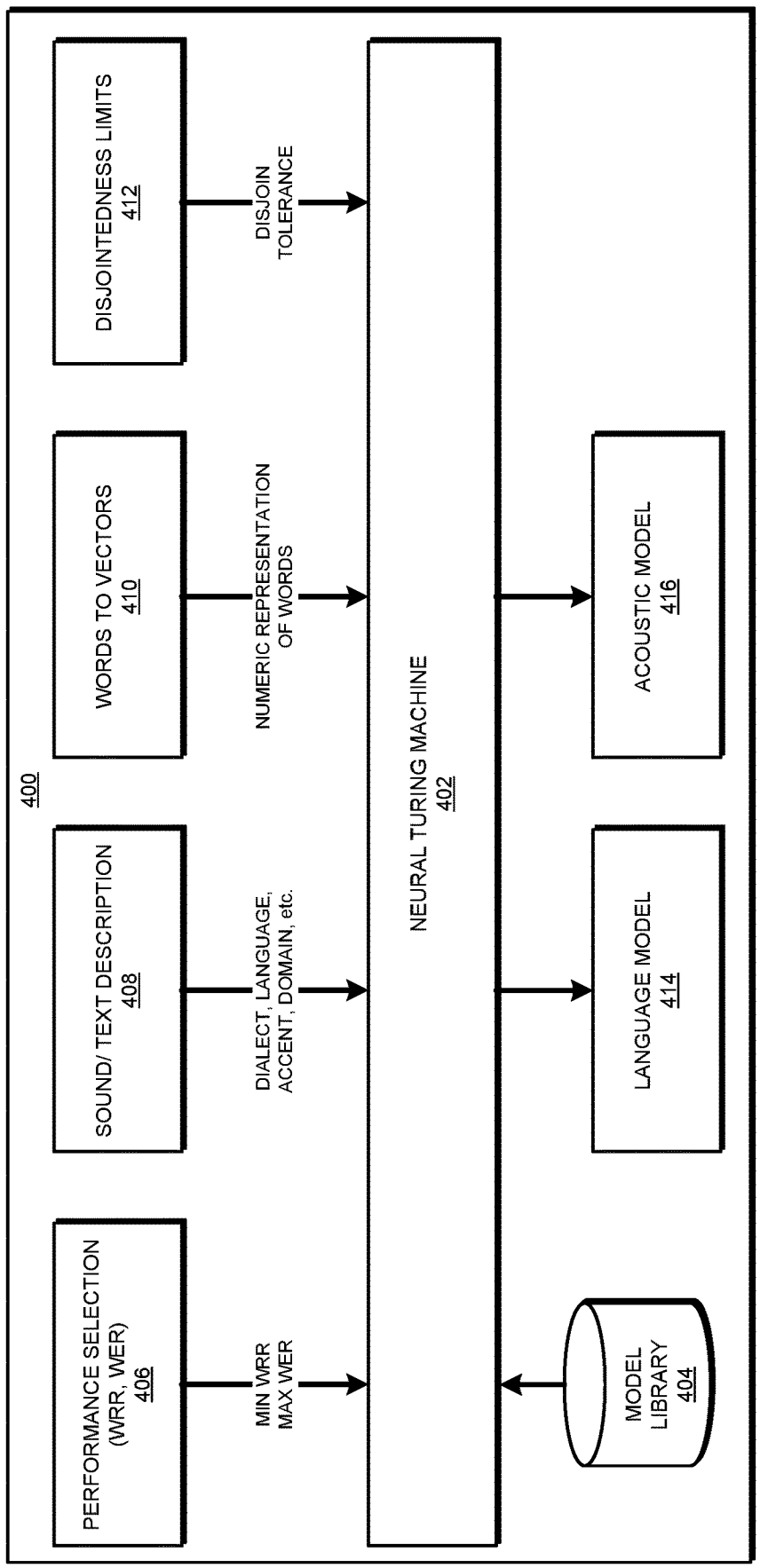
FIG. 4 depicts a block diagram of a model-pair selection process in accordance with an illustrative embodiment.

With reference to FIG. 4, this figure depicts a block diagram of a model-pair selection process in accordance with an illustrative embodiment. Process 400 can be performed using component 304 of application 302 in FIG. 3.

The application configured neural Turing machine 402 such that neural Turing machine 402 can access models library 404. The application further configures neural Turing machine 402 such that neural Turing machine 402 operates to use inputs 406, 408, 410, and 412 as determining factors for selecting at least one acoustic model and at least one language model from models library 404. Language model 414 is an example of the selected at least one language model. Acoustic model 416 is an example of the selected at least one acoustic model.

Input 406 specifies one or more acceptable performance criterion. For example, input 406 may specify a minimum WRR that is acceptable in a given ASR scenario, a maximum WER that is acceptable in the given ASR scenario, or both. Other suitable performance criteria can be similarly specified in input 406 within the scope of the illustrative embodiments.

Input 408 provides one or more sound descriptors that are descriptive of the speech that is to be recognized in the given ASR scenario. For example, input 408 may specify a dialect, a language, an accent, a domain, or some combination of these and other sound descriptors. For example, if a surgeon—Dr. John Doe, who is a native of Zurich Germany, is giving a discourse on thoracic surgery, input 408 might describe the sound of the speech using descriptors such as male voice, tenor range, German accent, High Alemannic dialect, English language, medical science domain.

These examples of sound descriptors are not intended to be limiting. From this disclosure, those of ordinary skill in the art will be able to conceive many other properties of the sounds in human speech, and the descriptors corresponding to such other properties are contemplated within the scope of the illustrative embodiments.

Input 410 includes one or more vectors representing one or more words existing in the domain, one or more words expected in the speech to be recognized, or words selected for some other reasons. Some of the other reasons for selecting words for words-to-vectors conversion include but are not limited to words used by a speaker, words used in a language, words used in a dialect, words used in the scenario where the speech is produced, and so on.

Input 412 specifies one or more limits acceptable for the disjointedness of the selected acoustic model and the language model. For example, in one case, input 412 might specify a single disjoin tolerance, where the disjointedness of the models has to be at a degree below the specified tolerance. In another case, a range of the disjoin tolerance may be specified to similarly bound the acceptable degree of disjointedness.

Neural Turing machine 402 correlates inputs 406-412 with the parameters associated with the models in models library 404. Neural Turing machine 402 outputs language model 414 and acoustic model 416 as the model-pair that satisfies inputs 406-412.

Figure 5:
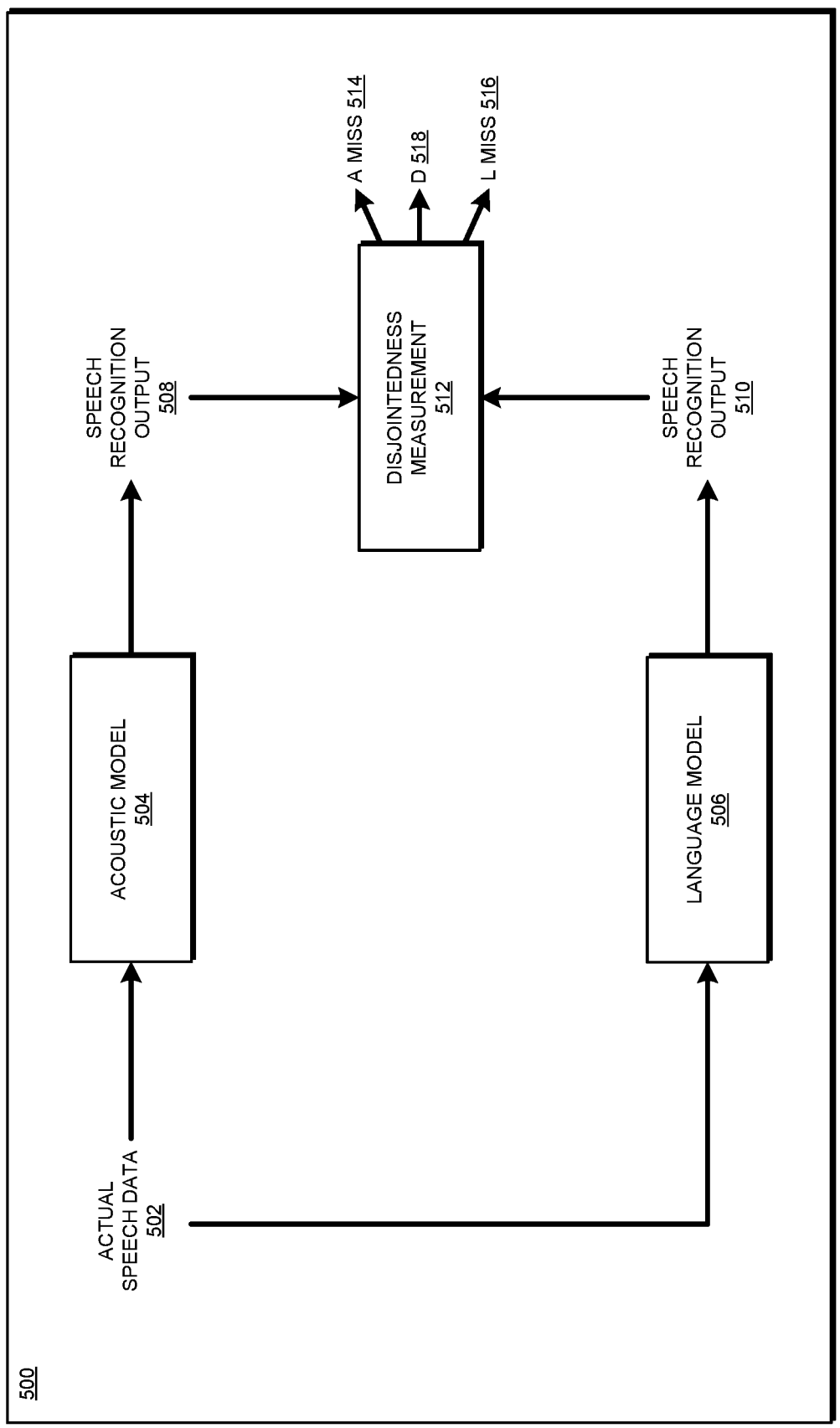
FIG. 5 depicts a flowchart of an example process for disjointedness measurement in accordance with an illustrative embodiment.

With reference to FIG. 5, this figure depicts a flowchart of an example process for disjointedness measurement in accordance with an illustrative embodiment. Process 500 can be performed using component 306 of application 302 in FIG. 3.

The application supplies actual speech data 502 to acoustic model 504 and language model 506. Acoustic model 504 produces recognition output 508 and language model 506 produces recognition output 510. Speech recognition outputs 508 and 510 can each be in the form of text or speech signal.

Component 512, which is an implementation of component 306 in FIG. 3, accepts outputs 508 and 510 as inputs. Component 512 compares speech recognition output 508 from acoustic model 504 and speech recognition output 510 from language model 506 to identify the words that acoustic model 504 missed (A miss 514) and the words that language model 506 missed (L miss 516).

Using A miss 514 and L miss 516, component 512 computes disjointedness measure D (518). In one example embodiment, D is a function of a portion of A miss 514 that is absent from L miss 516, a portion of L miss 516 that is absent from A miss 514, or both. For example, A miss 514 may include words [word1, word2, word3, word4] that acoustic model 504 missed from actual speech data 502. However, L miss 516 may include [word2, word4, word5, word6, word7] that language model 506 missed from actual speech data 502. Now D can be a function of [word1, word 3] which acoustic model 504 missed but language model 506 did not, [word5, word6, word7] which language model 506 missed but acoustic model 504 did not, or both of these subsets of words.

Figure 6:
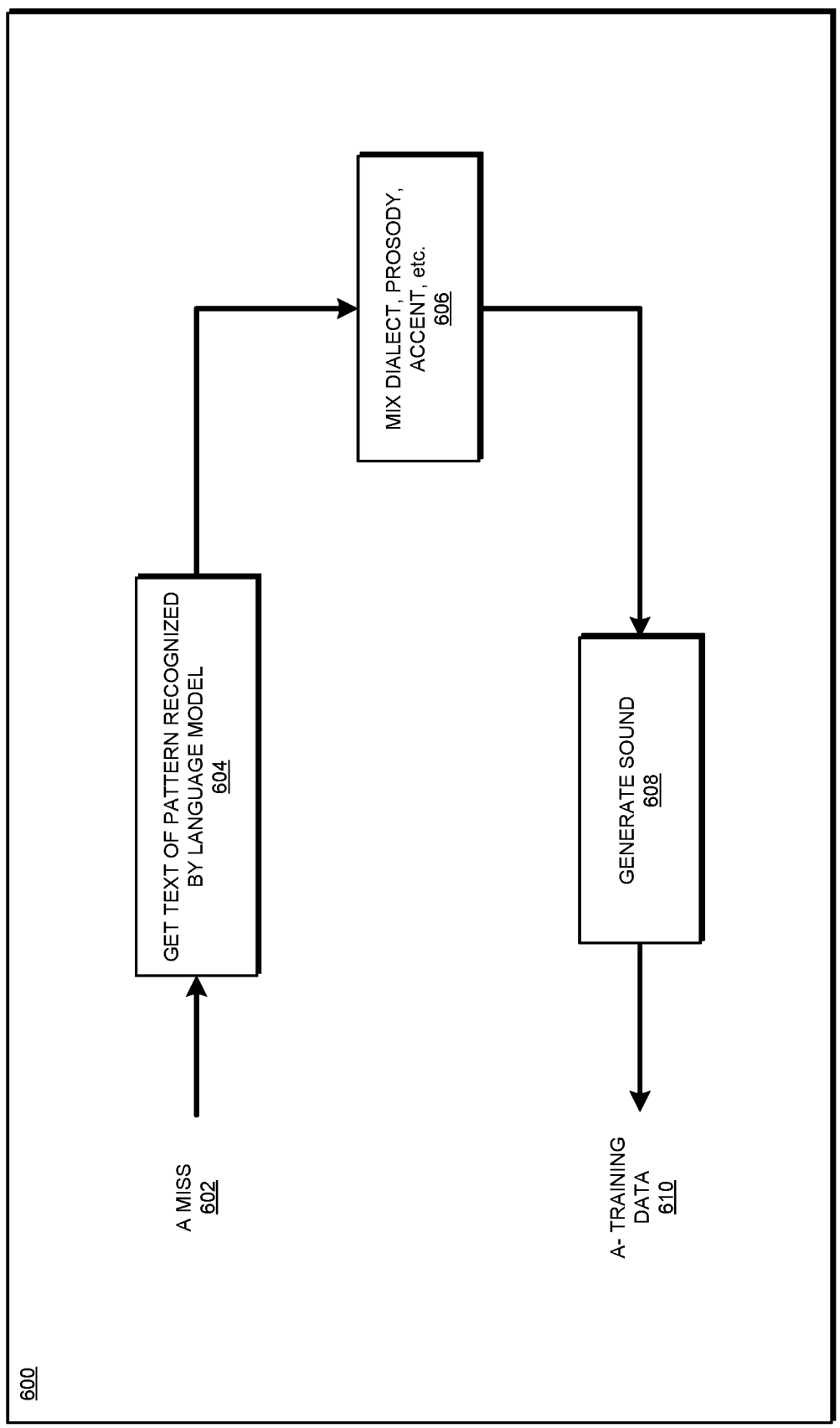
FIG. 6 depicts a flowchart of an example process for generating cross-training data for an acoustic model in accordance with an illustrative embodiment.

With reference to FIG. 6, this figure depicts a flowchart of an example process for generating cross-training data for an acoustic model in accordance with an illustrative embodiment. Process 600 can be implemented in component 308 of application 302 in FIG. 3.

The application selects a word 602 from an A miss list, such as A miss 514 of FIG. 5. The application obtains text representation 604 of word 602 from a speech-to-text system. The text-to-speech system may be, for example, system 107B in FIG. 1, or a system used or implemented by a language model, such as by language model 506 in FIG. 5.

The application mixes with text 604 one or more sound characteristics 606—which are describable using sound descriptors. For example, the application may mix, or specify to be mixed, with text 604 a dialect, a prosody, an accent, etc.

The application causes sound signal 608 to be generated from the mix of text 604 and sound characteristics 606. The application adds sound signal 608 to acoustic model training data (A-training data) 610. A-training data 610 is an example of training data 109B in FIG. 1.

Figure 7:
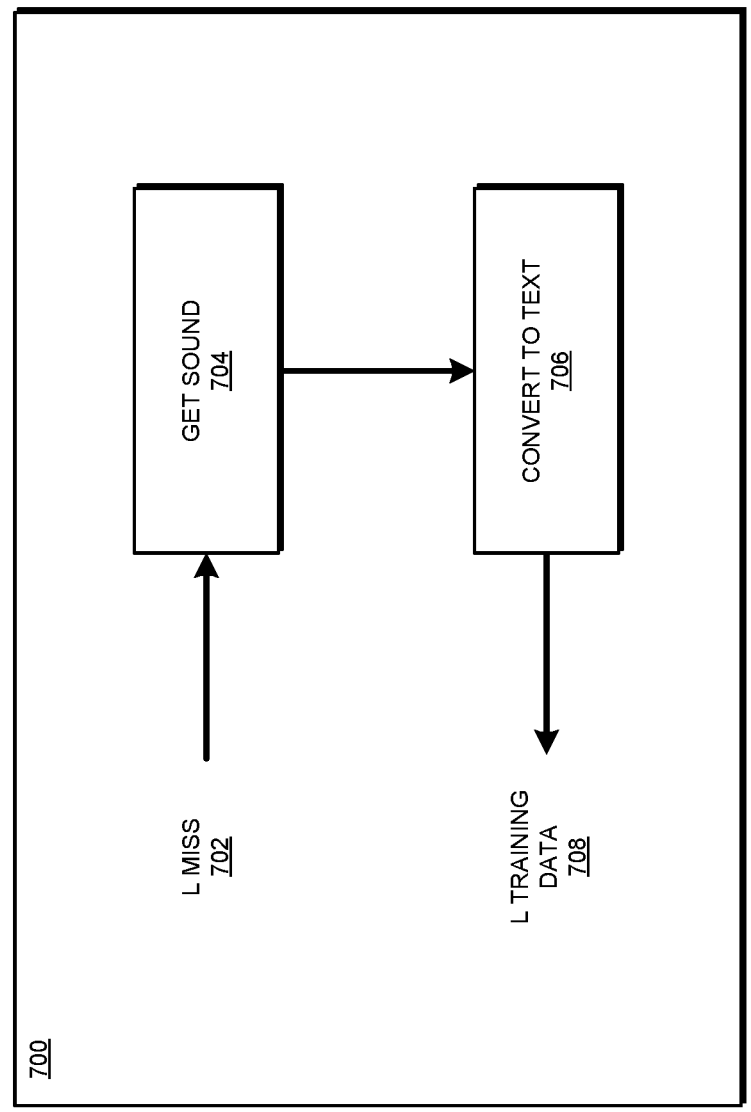
FIG. 7 depicts a flowchart of an example process for generating cross-training data for a language model in accordance with an illustrative embodiment.

With reference to FIG. 7, this figure depicts a flowchart of an example process for generating cross-training data for a language model in accordance with an illustrative embodiment. Process 700 can be implemented in component 308 of application 302 in FIG. 3.

The application selects a word 702 from an L miss list, such as L miss 516 of FIG. 5. The application obtains sound signal representation 704 of word 702 from the actual speech data, e.g., from actual speech data 502 in FIG. 5.

The application converts the speech signal to text 706 using a speech-to-text system. The speech-to-text system may be, for example, system 107A in FIG. 1, or a system used or implemented by a language model, such as by language model 506 in FIG. 5.

The application uses text 706 as the correct training response for the speech signal, when the speech signal is processed by the language model. For training the language model to recognize this correct response, the application adds text 706 and the speech signal to language model training data (L-training data) 708. L-training data 708 is an example of training data 109A in FIG. 1.

Figure 8:
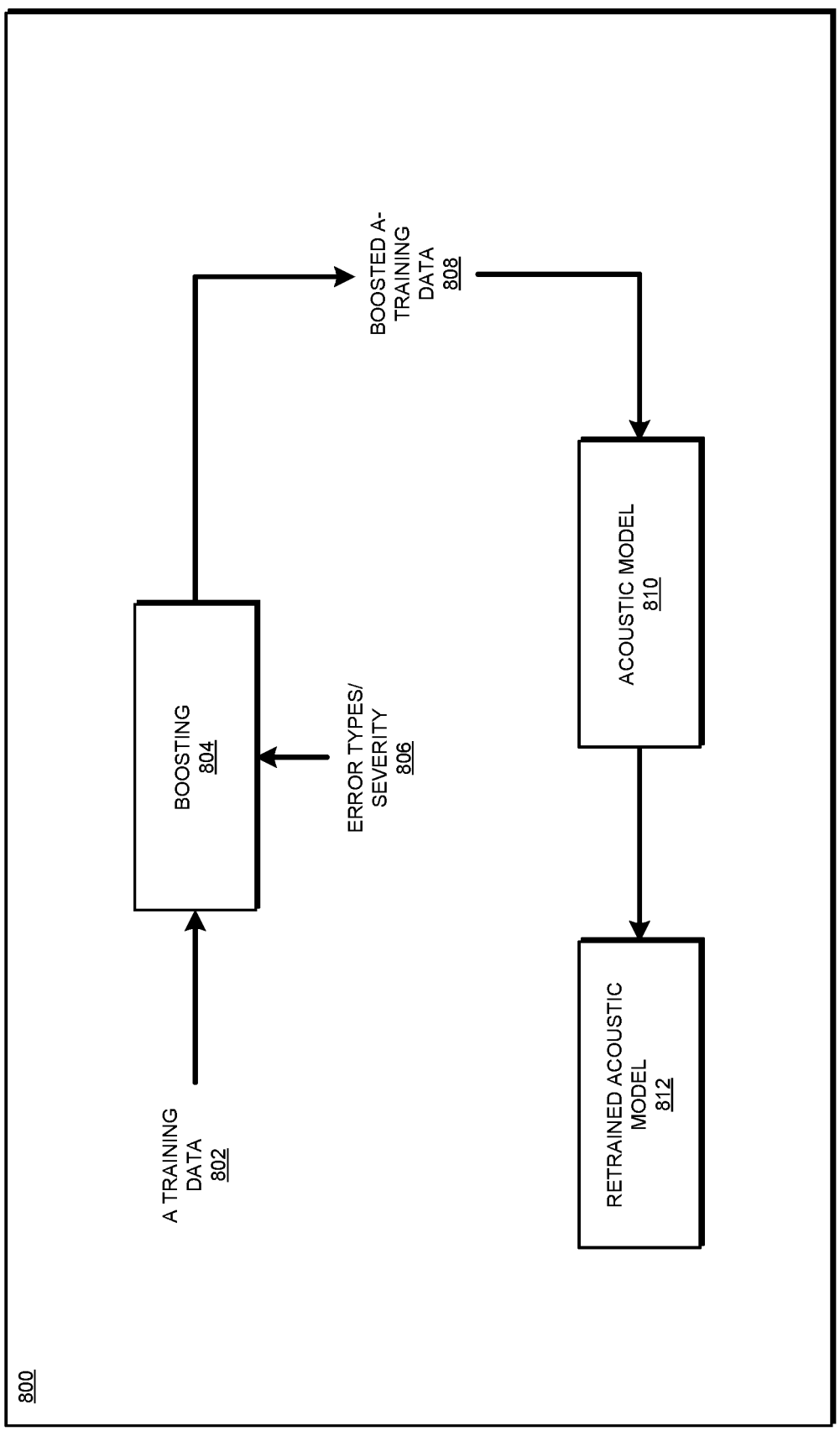
FIG. 8 depicts a flowchart of an example process for cross-training an acoustic model in accordance with an illustrative embodiment.

With reference to FIG. 8, this figure depicts a flowchart of an example process for cross-training an acoustic model in accordance with an illustrative embodiment. Process 800 can be implemented in component 310 of application 302 in FIG. 3.

To train an acoustic model that made errors in recognizing speech, the application obtains A-training data 802, such as A-training data 610 in FIG. 6. The application performs boosting operation 804, as described herein, using type or severity 806 of the error made by the acoustic model relative to a word or portion of A-training data 802. The application produces boosted A-training data 808 from the boosting operation.

The application sends boosted A-training data 808 to acoustic model 810. Acoustic model 810 is trained using boosted A-training data 808 to produce retrained acoustic model 812. Retrained acoustic model 812 is improved from acoustic model 810 such that a word error rate of acoustic model 812 with respect to the words in A-training data 802 generally decreases, a word recognition rate of acoustic model 812 with respect to the words in A-training data 802 generally increases, or both, relative to acoustic model 810. Retrained acoustic model 812 exhibits particularly decreased WER, increased WRR, or both, with respect to the boosted words in boosted training data 808.

Figure 9:
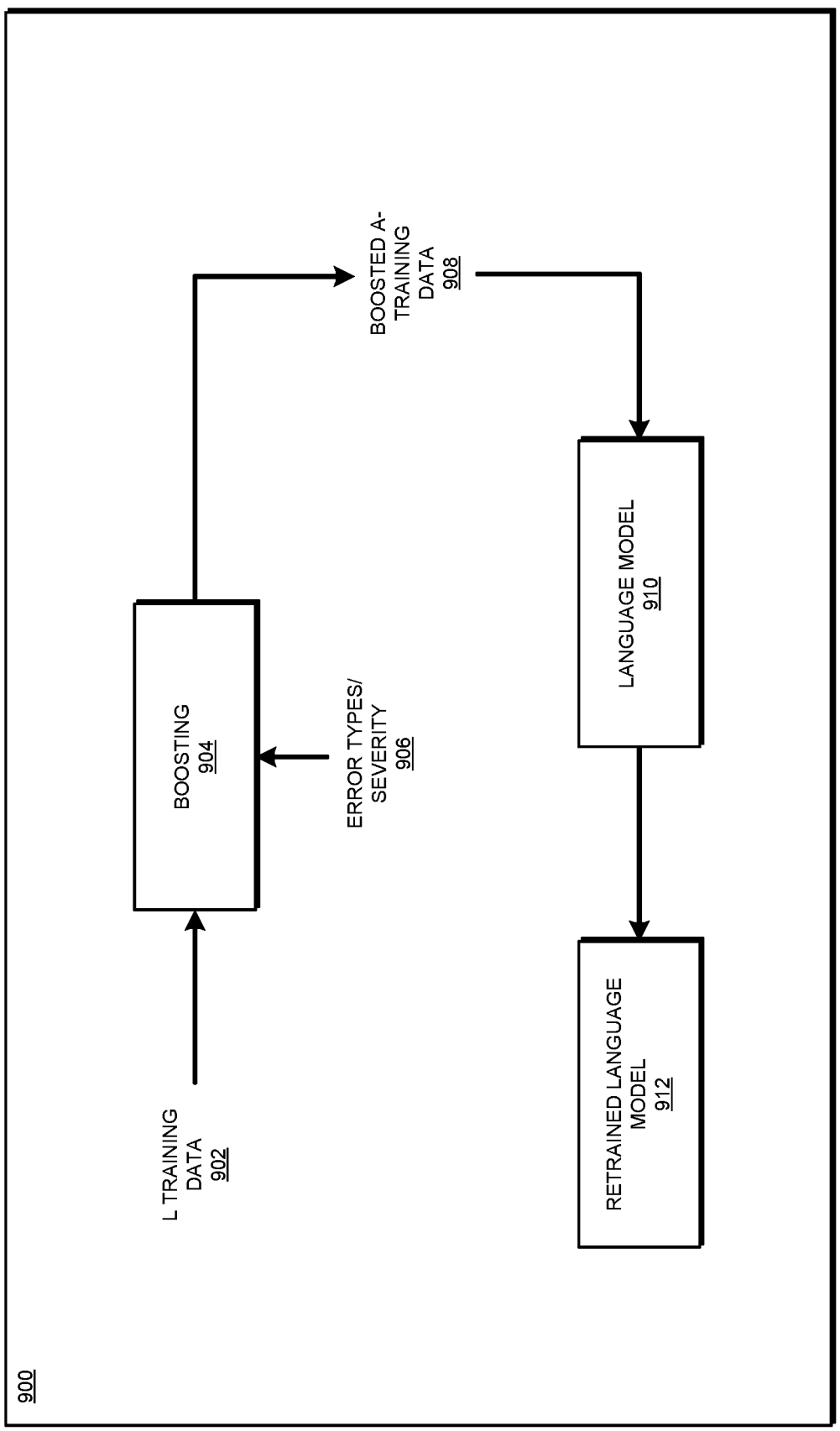
FIG. 9 depicts a flowchart of an example process for cross-training a language model in accordance with an illustrative embodiment.

With reference to FIG. 9, this figure depicts a flowchart of an example process for cross-training a language model in accordance with an illustrative embodiment. Process 900 can be implemented in component 310 of application 302 in FIG. 3.

To train a language model that made errors in recognizing speech, the application obtains L-training data 902, such as L-training data 708 in FIG. 7. The application performs boosting operation 904, as described herein, using type or severity 906 of the error made by the language model relative to a word or portion of L-training data 902. The application produces boosted L-training data 908 from the boosting operation.

The application sends boosted L-training data 908 to language model 910. Language model 910 is trained using boosted L-training data 908 to produce retrained language model 912. Retrained language model 912 is improved from language model 910 such that a word error rate of language model 912 with respect to the words in L-training data 902 generally decreases, a word recognition rate of language model 912 with respect to the words in L-training data 902 generally increases, or both, relative to language model 910. Retrained language model 912 exhibits particularly decreased WER, increased WRR, or both, with respect to the boosted words in boosted training data 908.

Figure 10:
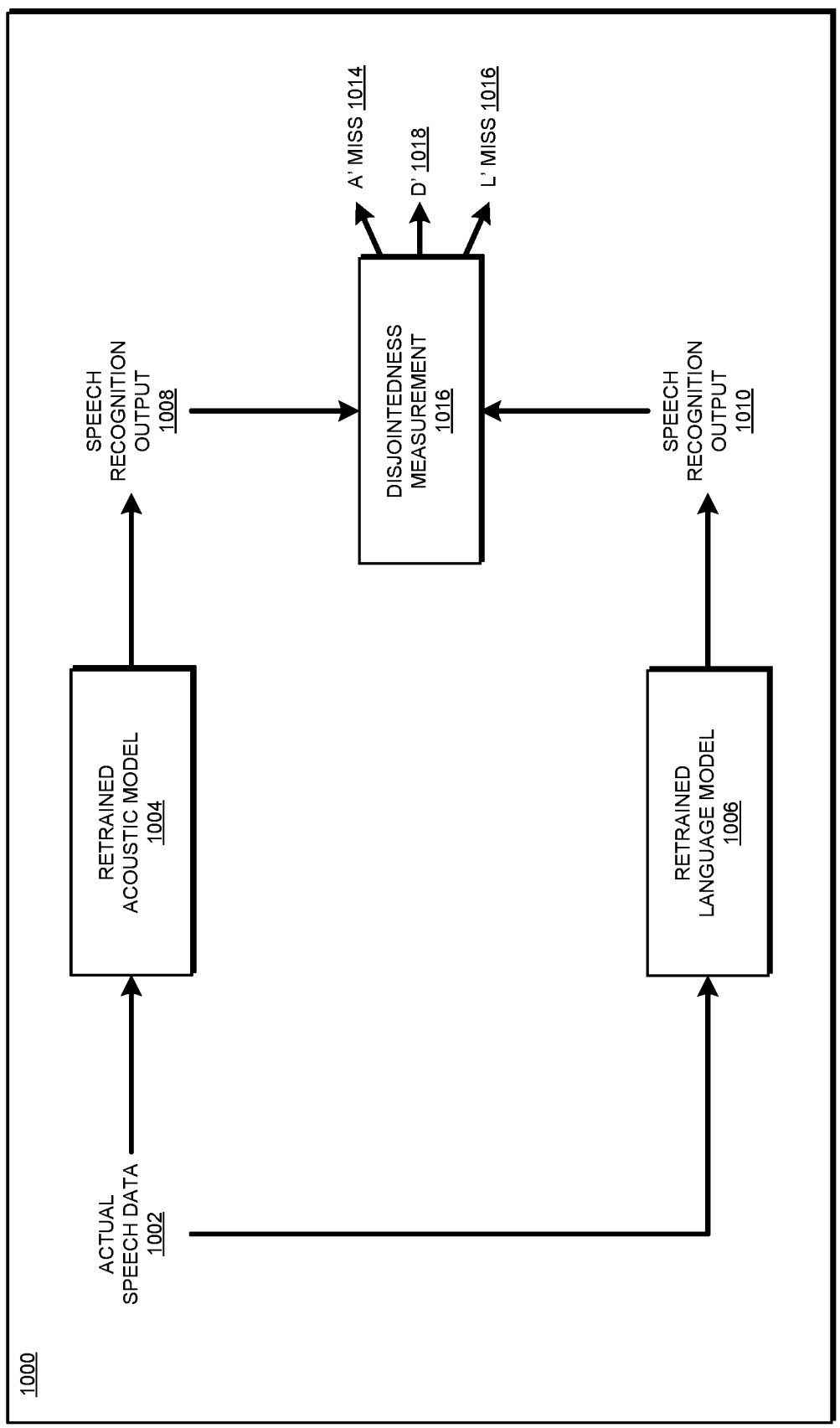
FIG. 10 depicts a flowchart of an example process for disjointedness measurement in accordance with an illustrative embodiment.

With reference to FIG. 10, this figure depicts a flowchart of an example process for disjointedness measurement in accordance with an illustrative embodiment. Process 1000 can be performed using component 306 of application 302 in FIG. 3.

The application supplies actual speech data 1002, which can be but need not be the same as actual speech data 502 in FIG. 5, to retrained acoustic model 1004 and retrained language model 1006. Acoustic model 1004 produces recognition output 1008 and language model 1006 produces recognition output 1010. Speech recognition outputs 1008 and 1010 can each be in the form of text or speech signal.

Component 1012, which is an implementation of component 306 in FIG. 3, accepts outputs 1008 and 1010 as inputs. Component 1012 compares speech recognition output 1008 from acoustic model 1004 and speech recognition output 1010 from language model 1006 to identify a revised list of the words that acoustic model 1004 missed (A' miss 1014) and the words that language model 1006 missed (L' miss 1016).

Using A' miss 1014 and L' miss 1016, component 1012 computes revised disjointedness measure D' (1018). In one example embodiment, D' is a function of a portion of A' miss 1014 that is absent from L' miss 1016, a portion of L' miss 1016 that is absent from A' miss 1014, or both, in a manner similar to the description of FIG. 5. The revised D' can be stored in the model library relative to retrained acoustic model 1004 and retrained language model 1006, e.g., for future use by neural Touring machine 402 in FIG. 4.

Thus, a computer implemented method, system or apparatus, and computer program product are provided in the illustrative embodiments for deep language and acoustic modeling convergence and cross-training and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
providing a selected acoustic model and a selected language model as a selected model pair for word recognition processing of a current speech signal, wherein the selected model pair is provided from among candidate acoustic and language model pairs in a model library and is selected responsive to values of first disjointedness measures of the respective candidate model pairs, including a value of a first disjointedness measure of the candidate model pair that is selected as the selected model pair, wherein each of the first disjointedness measures is based on numbers of words missed by the respective candidate model pairs in word recognition processing;
obtaining, from an output of the selected language model, a text version of a first word missed in a first instance of word recognition processing of the current speech signal by the selected acoustic model but not missed in a first instance of word recognition processing of the current speech signal by the selected language model;
converting the text version of the first word obtained from the language model text output to an acoustic version of the first word;
training the selected acoustic model on acoustic model training data including the acoustic version of the first word at least by inputting the acoustic version of the first word to the selected acoustic model with the selected acoustic model in a training mode;
obtaining, from an output of the selected acoustic model, an acoustic version of a second word missed in the first instance of the word recognition processing of the current speech signal by the selected language model but not missed in the first instance of word recognition processing of the current speech signal by the selected acoustic model;
converting the acoustic version of the second word to a text version of the second word; and
training the selected language model on language model training data including the text version of the second word at least by inputting the text version of the second word to the selected language model with the selected language model in a training mode.

2. The method of claim 1, further comprising:
performing, by the selected model pair, respective second instances of word recognition processing of the current speech signal after the training of the selected acoustic model and after the training of the selected language model;
calculating, after the training of the selected acoustic model and after the training of the selected language model, a value of a second disjointedness measure for the selected model pair based on words missed in the second instances of word recognition processing of the current speech signal; and storing the value of the second disjointedness measure in the model library in association with the selected acoustic model and selected language model of the selected model pair.

3. The method of claim 1, wherein training the selected acoustic model further comprises:

determining a measure of error for the selected acoustic model, based on misidentification of the first word in the first instance of the selected acoustic model word recognition processing;

modifying a number of occurrences of the acoustic version of the first word in the acoustic model training data based on a function of the measure of error.

4. The method of claim 3, wherein the measure of error comprises a ratio of a first number of times the selected acoustic model misidentifies the first word to a second number of times the selected acoustic model does not misidentify the first word.

5. The method of claim 4, wherein modifying the number of occurrences of the acoustic version of the first word comprises providing, in response to an increase in the ratio of the first number of times and the second number of times, additional occurrences of the acoustic version of the first word in acoustic model training data.

6. The method of claim 1, wherein training the selected language model further comprises:

determining a measure of error for the selected language model based on misidentification of the second word in the first instance of the selected language model word recognition processing;

modifying a number of occurrences of the text version of the of the second word in the language model training data based on a function of the measure of error.

7. The method of claim 6, wherein the measure of error comprises a ratio of a first number of times the selected language model misidentifies the second word to a second number of times the selected language model does not misidentify the second word.

8. The method of claim 7, wherein modifying the number of occurrences of the text version of the second word comprises providing, in response to an increase in the ratio of the first number and the second number, additional occurrences of the text version of the second word in the language model training data.

9. The method of claim 1, wherein the degree of disjointedness is calculated as a function of a number of words in the current speech signal that a first one of the models in the selected model pair does not misidentify, and a second one of the models in the selected model pair misidentifies.

10. The method of claim 1, wherein selecting the acoustic model and the language model to form the selected model pair comprises:

configuring a neural Turing machine to correlate a set of inputs to the candidate model pairs in the model library, the set of inputs comprising a vector of words expected to be present in speech to be processed, and an acceptable disjointedness limit input; and outputting from the neural Turing machine the selected acoustic model and the selected language model of the selected model pair based on the set of inputs.

11. The method of claim 10, wherein the set of inputs further comprises a performance specification and a set of sound descriptors, wherein the performance specification specifies at least one of a minimum acceptable word recognition rate for a subject-matter domain of the speech to be processed or a maximum acceptable word error rate for a subject-matter domain of the speech input signal, and wherein the set of sound descriptors comprises at least one of a prosody of speech, an accent used by a speaker, or a dialect of a language used by a speaker of the speech.

12. The method of claim 1, wherein the value of the second disjointedness measure is lower than the value of the first disjointedness measure for the selected model pair prior to the training of the selected acoustic model and the training of the selected language model.

13. A computer usable program product comprising one or more computer-readable storage devices, and program instructions stored on at least one of the one or more storage devices, the stored program instructions comprising:

program instructions to provide a selected acoustic model and a selected language model as a selected model pair for word recognition processing of a current speech signal, wherein the selected model pair is provided from among candidate acoustic and language model pairs in a model library and is selected responsive to values of first disjointedness measures of the respective candidate model pairs, including a value of a first disjointedness measure of the candidate model pair that is selected as the selected model pair, wherein each of the first disjointedness measures is based on numbers of words missed by the respective candidate model pairs in word recognition processing;

program instructions to obtain, from an output of the selected language model, a text version of a first word missed in a first instance of word recognition processing of the current speech signal by the selected acoustic model but not missed in a first instance of word recognition processing of the current speech signal by the selected language model;

program instructions to convert the text version of the first word obtained from the language model text output to an acoustic version of the first word;

program instructions to train the selected acoustic model on acoustic model training data including the acoustic version of the first word at least by inputting the acoustic version of the first word to the selected acoustic model with the selected acoustic model in a training mode;

program instructions to obtain, from an output of the selected acoustic model, an acoustic version of a second word missed in the first instance of the word recognition processing of the current speech signal by the selected language model but not missed in the first instance of word recognition processing of the current speech signal by the selected acoustic model;

program instructions to convert the acoustic version of the second word to a text version of the second word; and program instructions to train the selected language model on language model training data including the text version of the second word at least by inputting the text version of the second word to the selected language model with the selected language model in a training mode.

14. The computer usable program product of claim 13, further comprising:

program instructions to perform, by the selected model pair, respective second instances of word recognition processing of the current speech signal after the training of the selected acoustic model and after the training of the selected language model;

program instructions to calculate, after the training of the selected acoustic model and after the training of the selected language model, a value of a second disjointedness measure for the selected model pair based on words missed in the second instances of word recognition processing of the current speech signal; and program instructions to store the value of the second disjointedness measure in the model library in association with the selected acoustic model and selected language model of the selected model pair.

15. The computer usable program product of claim 13, wherein the program instructions to train the selected acoustic model further comprises:
program instructions to determine a measure of error for the acoustic model, based on misidentification of the first word in the first instance of the acoustic model word recognition processing;
program instructions to modify a number of occurrences of the acoustic version of the first word in the acoustic model training data based on a function of the measure of error.

16. The computer usable program product of claim 15, wherein the measure of error comprises a ratio of a first number of times the selected acoustic model misidentifies the first word to a second number of times the selected acoustic model does not misidentify the first word.

17. The computer usable program product of claim 16, wherein the program instructions to modify the number of occurrences of the acoustic version of the first word comprises providing, in response to an increase in the ratio of the first number of times and the second number of times, additional occurrences of the acoustic version of the first word in acoustic model training data.

18. The computer usable program product of claim 13, wherein the program instructions to train the selected language model further comprises:
program instructions to determine a measure of error for the selected language model based on misidentification of the second word in the first instance of the selected language model word recognition processing;
program instructions to modify modifying a number of occurrences of the text version of the of the second word in the language model training data based on a function of the measure of error.

19. The computer usable program product of claim 18, wherein the measure of error comprises a ratio of a first number of times the selected language model misidentifies the second word to a second number of times the selected language model does not misidentify the second word.

20. The computer usable program product of claim 19, wherein the program instructions to modify the number of occurrences of the text version of the second word comprises providing, in response to an increase in the ratio of the first number and the second number, additional occurrences of the text version of the second word in the language model training data.

21. The computer usable program product of claim 13, wherein the degree of disjointedness is calculated as a function of a number of words in the current speech signal that a first one of the models in the selected model pair does not misidentify, and a second one of the models in the selected model pair misidentifies.

22. The computer usable program product of claim 13, wherein the program instructions to select the acoustic model and the language model to form the selected model pair comprises:

program instructions to configure a neural Turing machine to correlate a set of inputs to the candidate model pairs in the model library, the set of inputs comprising a vector of words expected to be present in speech to be processed, and an acceptable disjointedness limit input; and program instructions to output from the neural Turing machine the selected acoustic model and the selected language model of the selected model pair based on the set of inputs.

23. The computer usable program product of claim 22, wherein the set of inputs further comprises a performance specification and a set of sound descriptors, wherein the performance specification specifies at least one of a minimum acceptable word recognition rate for a subject-matter domain of the speech to be processed or a maximum acceptable word error rate for a subject-matter domain of the speech input signal, and wherein the set of sound descriptors comprises at least one of a prosody of speech, an accent used by a speaker, or a dialect of a language used by a speaker of the speech.

24. The computer usable program product of claim 13, wherein the value of the second disjointedness measure is lower than the value of the first disjointedness measure for the selected model pair prior to the training of the selected acoustic model and the training of the selected language model.

25. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to provide a selected acoustic model and a selected language model as a selected model pair for word recognition processing of a current speech signal, wherein the selected model pair is provided from among candidate acoustic and language model pairs in a model library and is selected responsive to values of first disjointedness measures of the respective candidate model pairs, including a value of a first disjointedness measure of the candidate model pair that is selected as the selected model pair, wherein each of the first disjointedness measures is based on numbers of words missed by the respective candidate model pairs in word recognition processing;
program instructions to obtain, from an output of the selected language model, a text version of a first word missed in a first instance of word recognition processing of the current speech signal by the selected acoustic model but not missed in a first instance of word recognition processing of the current speech signal by the selected language model;
program instructions to convert the text version of the first word obtained from the language model text output to an acoustic version of the first word;
program instructions to train the selected acoustic model on acoustic model training data including the acoustic version of the first word at least by inputting the acoustic version of the first word to the selected acoustic model with the selected acoustic model in a training mode;
program instructions to obtain, from an output of the selected acoustic model, an acoustic version of a second word missed in the first instance of the word recognition processing of the current speech signal by the selected language model but not missed in the first instance of word recognition processing of the current speech signal by the selected acoustic model;

program instructions to convert the acoustic version of the second word to a text version of the second word; and program instructions to train the selected language model on language model training data including the text version of the second word at least by inputting the text version of the second word to the selected language model with the selected language model in a training mode.

\* \* \* \* \*